(12) United States Patent
Chou et al.

(10) Patent No.: US 7,706,225 B2
(45) Date of Patent: Apr. 27, 2010

(54) RECORDING METHOD AND APPARATUS FOR OPTICAL DISK DRIVE

(75) Inventors: Tzu-Ming Chou, Sinjhuang (TW); Kun-Hung Hsieh, Hsinchu (TW)

(73) Assignee: Mediatek Inc., Hsinchu (TW)

( * ) Notice: Subject to any disclaimer, the term of this patent is extended or adjusted under 35 U.S.C. 154(b) by 0 days.

(21) Appl. No.: 12/327,398

(22) Filed: Dec. 3, 2008

(65) Prior Publication Data

US 2009/0080322 A1 Mar. 26, 2009

Related U.S. Application Data

(63) Continuation of application No. 10/711,943, filed on Oct. 14, 2004, now Pat. No. 7,522,493.

(30) Foreign Application Priority Data

Dec. 3, 2003 (TW) .............................. 92134059 A

(51) Int. Cl.
G11B 5/09 (2006.01)
(52) U.S. Cl. .............. 369/47.41; 369/47.33; 369/47.34; 369/47.28
(58) Field of Classification Search ................. 69/47.28, 69/47.33
See application file for complete search history.

(56) References Cited

U.S. PATENT DOCUMENTS

| 5,363,362 | A | 11/1994 | Maeda et al. |
| 5,852,593 | A | 12/1998 | Ishida et al. |
| 6,317,398 | B1 | 11/2001 | Shimada |
| 6,704,253 | B2 | 3/2004 | Tanaka |
| 6,754,150 | B1 | 6/2004 | Usui |
| 6,930,964 | B2 | 8/2005 | Matsui |
| 2001/0003519 | A1* | 6/2001 | Tsukihashi ............... 369/53.36 |
| 2002/0101793 | A1 | 8/2002 | Sakata |
| 2002/0172106 | A1 | 11/2002 | Kim et al. |
| 2003/0072235 | A1 | 4/2003 | Naoi et al. |
| 2003/0165097 | A1 | 9/2003 | Tseng et al. |
| 2003/0198155 | A1 | 10/2003 | Go et al. |
| 2004/0004920 | A1 | 1/2004 | Jung et al. |
| 2004/0141441 | A1* | 7/2004 | Nagai et al. ............... 369/47.42 |
| 2005/0030858 | A1 | 2/2005 | Hung et al. |
| 2005/0122869 | A1 | 6/2005 | Yamamoto |
| 2005/0128914 | A1 | 6/2005 | Yamamoto |

FOREIGN PATENT DOCUMENTS

| CN | 1452171 | 10/2003 |
| CN | 1488140 | 4/2004 |
| EP | 1 453 209 A2 | 9/2004 |
| JP | 9288827 A | 11/1997 |
| WO | WO 03/085839 A1 | 10/2003 |

* cited by examiner

*Primary Examiner*—Muhammad N. Edun
(74) *Attorney, Agent, or Firm*—Connolly Bove Lodge & Hutz LLP

(57) ABSTRACT

A recording method for an optical disk drive is implemented as follows. First, at least one of the level of the focusing error signal, the level of the tracking error signal, a wobble synchronization pattern loss, the error rate of demodulating a wobble signal and the frequency of buffer under-run occurrence is detected. If at least one detected value exceeds the preset value, the recording will be ceased. Then, the rotation speed of the optical disk drive is decreased, and the recording is resumed with the decreased rotation speed.

7 Claims, 3 Drawing Sheets

RECORDING METHOD AND APPARATUS FOR OPTICAL DISK DRIVE

This application is a continuation of Ser. No. 10/711,943 filed Oct. 14, 2004, which claims priority to CN 092134059 filed Dec. 3, 2003, the entire contents of all are hereby incorporated by reference.

BACKGROUND OF THE INVENTION (A) Field of the Invention

The present invention is related to a recording, or so-called burning, method and an apparatus for an optical disk drive, and more especially to a recording method and an apparatus capable of decreasing the rotation speed for an optical disk drive.

(B) Description of the Related Art

The recording speed, e.g., 4× or 8×, of an optical disk drive mainly depends on the type of the optical disk, and optical disks of different types have different time codes. If the quality of the optical disk or optical disk drive is worse intrinsically, the recording efficiency and quality will be affected, especially for mass recording, and thus inferior recording quality will become more obvious.

An inferior servo signal of an optical disk drive, e.g., defocusing, or buffer under-run caused by that the data transmission speed from a host is slower than the recording speed, may give rise to the interruption of recording. After refocusing or complementing the data to the buffer, the recording will be reconnected and resumed. Because the recording speed before and after the interruption is not changed, the interruption and reconnection may occur repeatedly. Such unceasing recording interruption and reconnection seriously affect the recording speed, and even result in the degradation of the recording quality so that the readability of the optical disk will become worse.

U.S. Pat. Application No. 2002/0172106 A1, "Apparatus for and Method of Controlling Writing of Data When Error Occurs in an Optical Drive," reveals a method of dealing with a recording interruption employed after the recording is interrupted. However, the method cannot prevent the occurrence of interruption. In addition, if an optical disk is of inferior quality, the recording quality of the optical disk cannot be improved further.

SUMMARY OF THE INVENTION

The objective of the present invention is to provide a recording method and apparatus for an optical disk drive, which is capable of preventing the recording quality degradation due to the inferior servo signal, and can avoid the decrease of recording efficiency due to the continual recording interruption and reconnection caused by the buffer under-run.

To accomplish the above objective, the present invention discloses a recording method for an optical disk drive. First, at least one unstable signal source during the recording process is detected, where the unstable signal source is selected from the group of the level of a focusing error (FE) signal, the level of a tracking error (TE) signal, a wobble synchronization pattern loss, the error rate of demodulating a wobble signal and the frequency of the buffer under-run occurrence of the optical disk drive. The recording will be paused if any detected value of the unstable signal source exceeds a preset threshold value. Afterwards, the rotation speed of the optical disk drive is decreased, and the recording is resumed with the decreased rotation speed.

The above-described recording method can be implemented using a recording apparatus for an optical disk drive. The recording, apparatus comprises a driver, a servo signal generation unit, a microprocessor and a digital signal processor (DSP), where the driver is used for controlling the rotation speed of the optical disk drive, and the servo signal generation unit is used to generate the level of an FE signal and the level of a TE signal of the optical disk drive and generate and demodulate a wobble signal, so as to obtain a wobble synchronization pattern loss. The microprocessor can execute a detection mechanism, a recording termination control mechanism and a recording speed adjustment mechanism. The detection mechanism is intended to detect the error rate of demodulating the wobble signal and the frequency of the buffer under-run occurrence. If at least one of the level of the FE signal, the level of the TE signal, the wobble synchronization pattern loss, the error rate of demodulating the wobble signal and the frequency of the buffer under-run occurrence exceeds a preset threshold value, the recording termination control mechanism will cease recording based on the recording status at that time, and the recording speed adjustment mechanism will set parameters for reducing the rotation speed of the optical disk drive. Then, the parameters are transmitted to the DSP to generate a driving signal, so as to instruct the driver to decrease the rotation speed of the optical disk drive.

The recording method and apparatus of an optical disk drive in accordance with the present invention use the microprocessor to real-time monitor the optical disk drive, in which the servo signals of the optical disk drive, the frequency of the buffer under-run occurrence and the error rate of demodulating the wobble signal during recording are continuously monitored to timely adjust the rotation speed of the optical disk drive, with a view to preventing the continual servo signal deterioration and the buffer under-run.

DETAILED DESCRIPTION OF THE INVENTION

Figure 1:
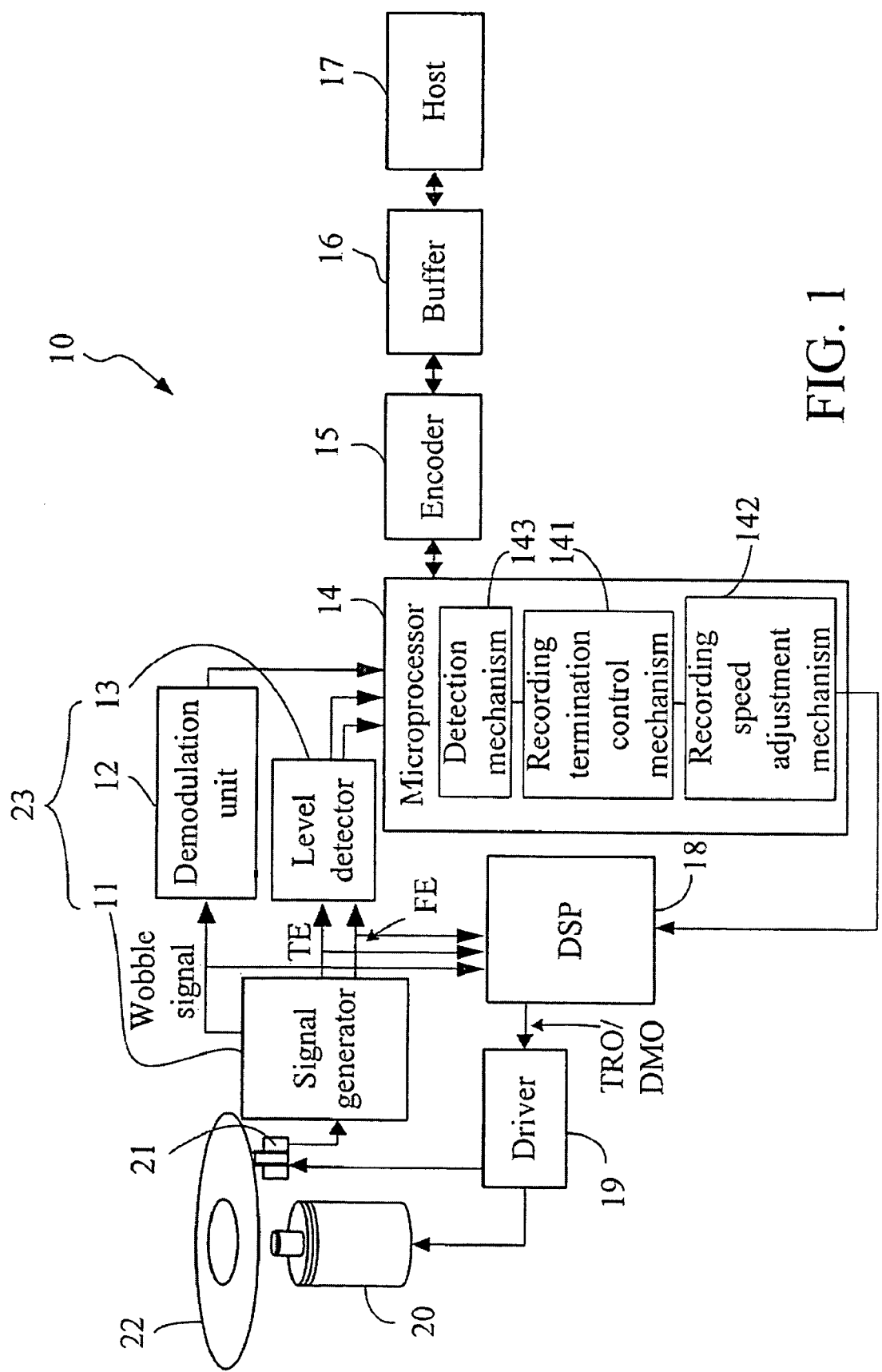
FIG. 1 illustrates the recording apparatus of an optical disk drive in accordance with the present invention.

FIG. 1 is a schematic diagram of an embodiment of the recording apparatus of an optical disk drive in accordance with the present invention. A recording apparatus 10 for an optical disk drive comprises a signal generator 11, a demodulation unit 12, the level detector 13, a microprocessor 14, an encoder 15, a buffer 16, a host 17, a DSP 18 and a driver 19, where the signal generator 11, the demodulation unit 12 and the level detector 13 constitute a servo signal generation unit 23. The signal generator 11 connected to an optical pickup head 21 is used to synthesize the optical signals read from an optical disk 22 by the optical pickup head 21, so as to generate the TE signals required for track locking, the FE signals required for focusing, and the wobble signals required for positioning or controlling the rotation speed. All these servo signals are then sent to the DSP 18 for processing so as to generate driving signals TRO and DMO. The driver 19 is able to drive the optical pickup head 21 by the driving signal TRO, and drive the motor 20 to rotate the optical disk 22 by the driving signal DMO. Besides being transmitted to the DSP 18 from the signal generator 11, the TE, FE and the wobble signals are also sent to the demodulation unit 12 and the level detector 13, respectively. The demodulation unit 12 is used to demodulate the wobble signal, and if the error rate is too high or the wobble synchronization pattern loss exceeds a preset threshold value, a recording termination control mechanism 141 and a recording speed adjustment mechanism 142 will be activated to interrupt recording and decrease the rotation speed of the motor 20, i.e., the recording speed is decreased. If the level detector 13 figures out that the levels of the TE and FE signals exceed preset threshold values, the recording termination control mechanism 141 and the recording speed adjustment mechanism 142 will be activated as well. The microprocessor 14 is used to control and execute the recording termination control mechanism 141 and the recording speed adjustment mechanism 142. First, the recording termination control mechanism 141 sends a recording pause command to the encoder 15 and informs the host 17 to stop transferring data to the buffer 16. When the recording termination is confirmed, the microprocessor 14 will set relative parameters for decreasing the rotation speed of the optical disk drive, and transmit the parameters to the DSP 18 for generating the driving signal DMO to lower the rotation speed of the motor 20. Afterwards, the recording termination control mechanism 141 sends a recording connection command to the encoder 15 to implement the sequential recording work and continuously monitor whether the servo signals meet the recording termination criteria. Further, the microprocessor 14 also can implement a detection mechanism 143 to detect the error rate of demodulating a wobble signal and the frequency of the buffer under-run occurrence. If the error rate of demodulating the wobble signal and the frequency of the buffer under-run occurrence exceed the preset threshold values, the recording termination control mechanism 141 and the recording speed adjustment mechanism 142 will also be activated to cease recording and decrease the recording speed.

Figure 2:
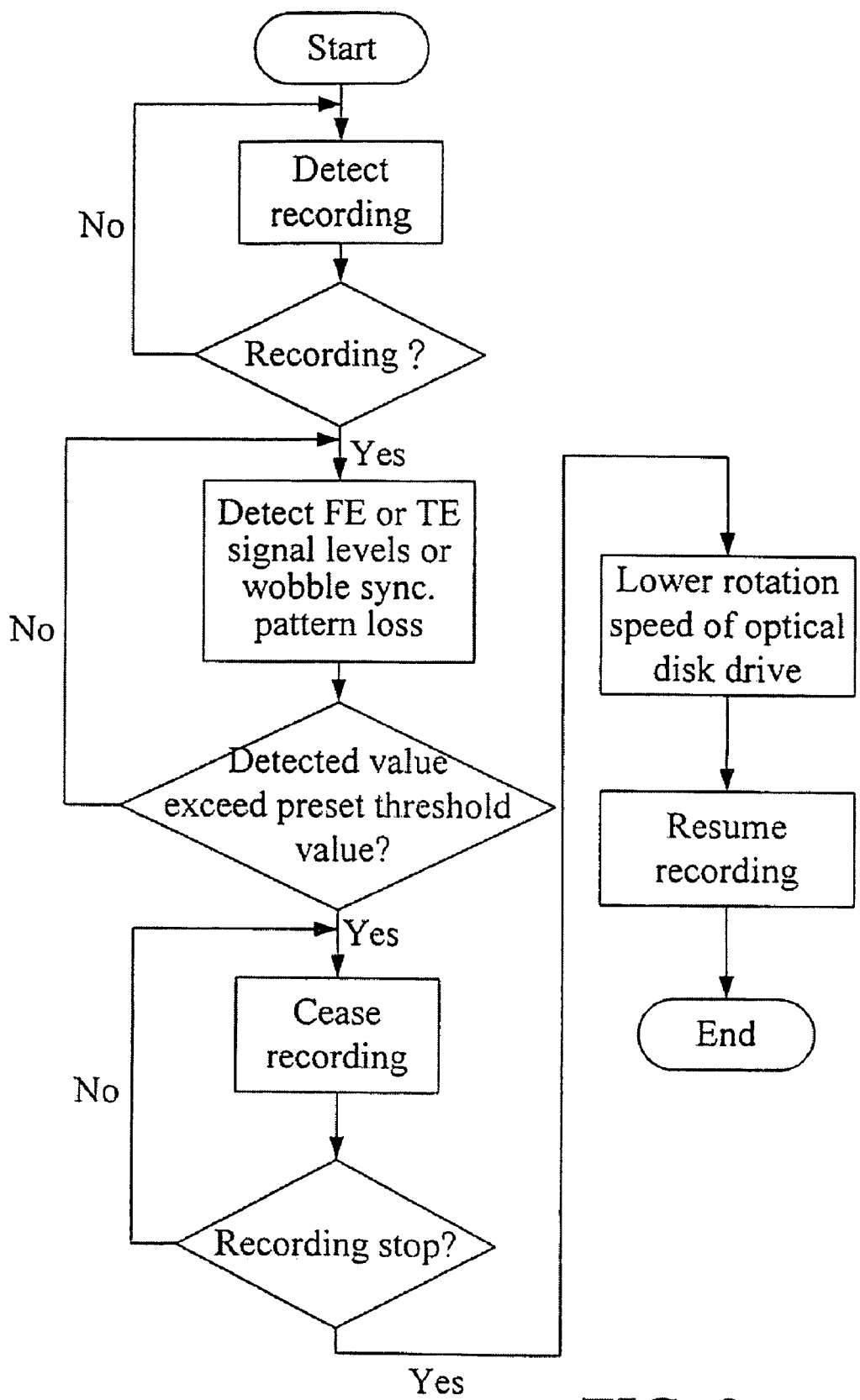
FIG. 2 illustrates a recording flow chart of an optical disk drive in accordance with the present invention.

The above-described recording process can be concluded as shown in FIG. 2. First, if the recording is underway in the optical disk drive, the detection of servo signals such as the level of the FE or TE signal and the wobble synchronization pattern loss are started. If the detected values of the above-described servo signals exceed the preset thresholds, the recording will be ceased. Subsequently, the rotation speed of the optical disk drive is decreased and the sequential recording work is resumed. The above described recording process can be supplemented with a step of detecting the recording status to ensure whether the optical disk drive is in recording or stop status, so as to avoid the impact of the recording quality and the recording speed due to the error during the implementation of detecting the servo signal or decreasing recording speed.

Figure 3:
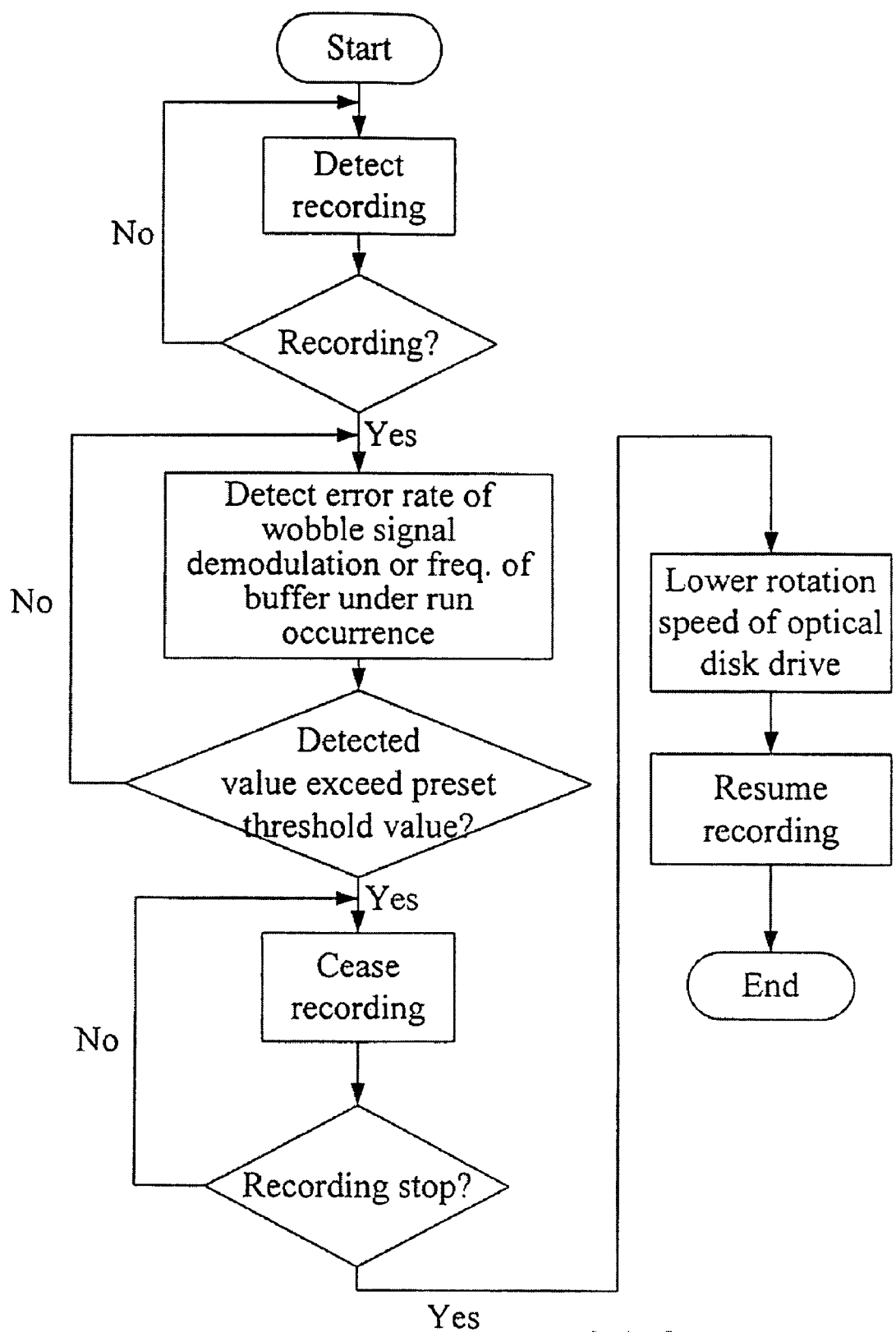
FIG. 3 illustrates another recording flow chart of an optical disk drive in accordance with the present invention.

Besides taking the above-described servo signals as the basis for decreasing the rotation speed of the optical disk drive, the error rate of demodulating the wobble signal or the number of recording interruption caused by the buffer under-run in a time period, i.e., the frequency of the buffer under-run occurrence, also can be calculated as the basis for activating the recording speed adjustment mechanism. If the error rate of demodulating a wobble signal or the frequency of the buffer under-run occurrence exceeds the preset threshold value, the recording is not resumed until the rotation speed of the optical disk drive is decreased. The above process is shown in FIG. 3.

The above-described embodiments of the present invention are used to be illustrative only. Numerous alternative embodiments may be devised by those skilled in the art without departing from the scope of the following claims.

What is claimed:

1. A recording apparatus for controlling a rotation speed of an optical disk, comprising:
   a microprocessor, comprising:
   a detection mechanism for detecting a frequency of buffer under-run occurrence during recording;
   a recording termination control mechanism for ceasing recording if an output of the detection mechanism exceeds a preset threshold value; and
   a recording speed adjustment mechanism for setting parameters with a lower rotation speed if the recording is ceased by the recording termination control mechanism; and
   a digital signal processor for converting the parameters with the lower rotation speed into a driving signal that instructs to decrease the rotation speed of the optical disk.

2. The recording apparatus in claim 1, further comprising an encoder connected to the microprocessor.

3. The recording apparatus in claim 2, further comprising a buffer connected to the encoder.

4. The recording apparatus in claim 1, wherein if the output of the detection mechanism exceeds a preset value and the recording is ceased, the recording termination control mechanism remains at the ceased status.

5. A recording method for controlling a rotation speed of an optical disk, comprising the steps of:
   detecting a frequency of buffer under-run occurrence during recording;
   ceasing recording if the frequency exceeds a preset threshold value;
   decreasing a rotation speed of the optical disk; and
   resuming recording with the decreased rotation speed.

6. The recording method in claim 5, further comprising the step of ensuring that the recording is stopped after the operation of ceasing recording is instructed.

7. The recording method in claim 5, wherein ceasing recording and decreasing the rotation speed of the optical disk are controlled by a microprocessor.

\* \* \* \* \*